United States Patent [19]
Larsen

[11] Patent Number: 5,914,540
[45] Date of Patent: Jun. 22, 1999

[54] FILTER FOR REMOVING HARMONIC CURRENT FROM A NEUTRAL CONDUCTOR

[75] Inventor: Einar Larsen, Charlton, N.Y.

[73] Assignee: General Electric Company, Schenectady, N.Y.

[21] Appl. No.: 08/865,526

[22] Filed: May 29, 1997

[51] Int. Cl.$^6$ ............................................. H02M 1/12
[52] U.S. Cl. ..................... 307/105; 323/205; 323/215; 333/12; 363/39
[58] Field of Search ................................. 307/105, 109; 333/12, 167, 172–175; 363/39, 40, 41, 44–48; 323/205, 207, 208, 211, 215; 340/310.01, 310.02, 310.03, 310.05

[56] References Cited

U.S. PATENT DOCUMENTS

| | | | |
|---|---|---|---|
| 3,700,959 | 10/1972 | Sakurai | 315/411 |
| 5,416,688 | 5/1995 | Levin | 363/39 |
| 5,574,356 | 11/1996 | Parker | 323/207 |
| 5,576,942 | 11/1996 | Beverly et al. | 363/39 |

*Primary Examiner*—Albert W. Paladini
*Attorney, Agent, or Firm*—Cantor Colburn LLP; Carl B. Horton

[57] ABSTRACT

A neutral conductor filter having three transformers. A first transformer has a primary winding connected to a first power conductor and the neutral conductor. A second transformer has a primary winding connected to a second power conductor and the neutral conductor. A third transformer has a primary winding connected to a third power conductor and the neutral conductor. The secondary windings of the transformers are connected in series with each other and a capacitor is connected in parallel with the series connected secondary windings. The capacitor is tuned with the leakage reactance of the transformers so that the impedance to zero-sequence third harmonic current is minimized.

3 Claims, 1 Drawing Sheet

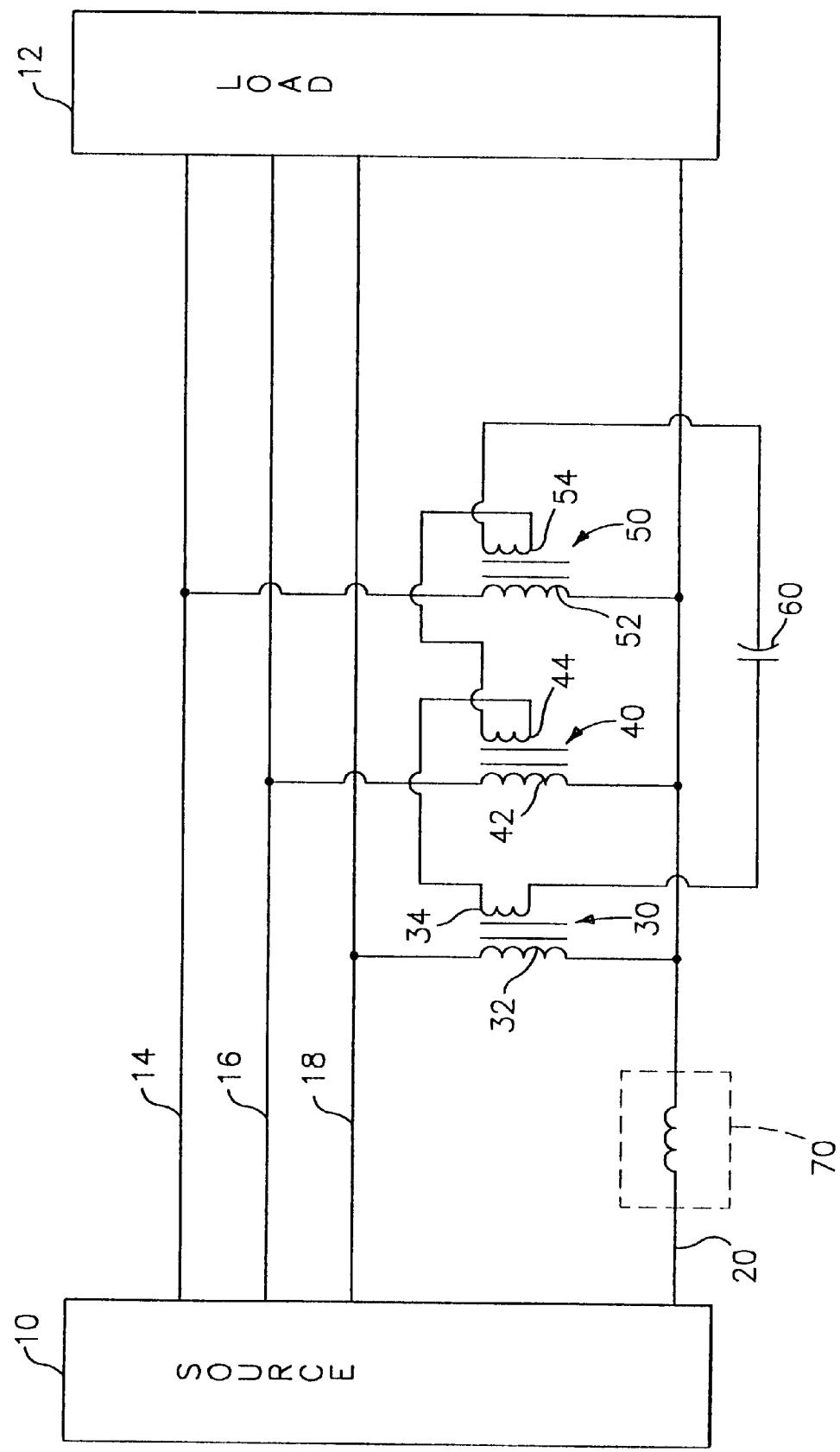

FILTER FOR REMOVING HARMONIC CURRENT FROM A NEUTRAL CONDUCTOR

BACKGROUND OF THE INVENTION

1. Field of the Invention

The invention relates in general to filters for use in power systems and in particular to a filter for removing harmonic current from a neutral conductor in a multiple phase power system.

2. Prior Art

Nonlinear loads on a power distribution system can draw a high level of harmonic current from the power source. In particular, low-cost rectifier loads, as commonly used in personal computers and associated hardware, draw a load current is very rich in triplen (3,9, . . . ) harmonics, with the third harmonic being predominant. At the three-phase source, this third harmonic content of load current is mostly of a zero-sequence nature. The consequence is that the neutral conductor in a 4-wire, 3-phase supply system is heavily loaded with third harmonic current. This creates a need to overrate the neutral conductor and the main supply transformer.

SUMMARY OF THE INVENTION

The above-discussed and other drawbacks and deficiencies of the prior art are overcome or alleviated by the neutral conductor filter of the present invention. The neutral conductor filter includes three transformers. A first transformer has a primary winding connected to a first power conductor and the neutral conductor. A second transformer has a primary winding connected to a second power conductor and the neutral conductor. A third transformer has a primary winding connected to a third power conductor and the neutral conductor. The secondary windings of the transformers are connected in series with each other. A capacitor is connected in parallel with the series connected secondary windings. The capacitor is tuned with the leakage reactance of the transformers so that the impedance to zero-sequence third harmonic current is minimized.

The neutral conductor filter of the present invention reduces the presence of harmonic current on the neutral conductor. This eliminates the need to overrate the neutral conductor and the source transformer.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIG. 1 is a schematic diagram of the filter of the present invention.

DETAILED DESCRIPTION OF THE INVENTION

FIG. 1 is a schematic diagram of the neutral conductor filter of the present invention installed in a three phase power system. It is understood that the filter of the present invention may be used in other multiple phase power systems such as 4-phase, 5-phase, 6-phase, etc. by using additional transformers. As shown in FIG. 1, a source 10 of three phase power is connected to load 12. A first power conductor 14 carries a first current phase, a second power conductor 16 carries a second current phase, a third power conductor 18 carries a third current phase and a neutral conductor 20 provides the return to the source 10.

The filter for removing the harmonics from the neutral conductor 20 is made up of three transformers 30, 40 and 50 and a capacitor 60. The first transformer 30 has a primary winding 32 that is connected to the third conductor 18 and the neutral conductor 20. The second transformer 40 has a primary winding 42 that is connected to the second conductor 16 and the neutral conductor 20. The third transformer 50 has a primary winding 52 that is connected to the first conductor 14 and the neutral conductor 20. The primary windings 32, 42 and 52 are wye connected.

The secondary windings 34, 44 and 54 of the transformers 30, 40 and 50, are connected in series with each other. A capacitor 60 is connected in parallel with the series connected secondary windings. In an exemplary embodiment, the capacitor 60 is selected to tune with the leakage reactance of the transformers 30, 40 and 50 so that impedance of each transformer to zero-sequence third harmonic current is minimized. This mitigates the third harmonic content of neutral current. The filter has a high impedance to balanced sequence current and allows balanced sequence current to remain on the neutral conductor 20. It is understood the capacitor 60 may be selected so that the filter is tuned to harmonics other than triplen harmonics.

The transformer-based, neutral conductor filter acts as a shunt path for the third harmonic content of the load current which would otherwise flow in the neutral conductor 20. The filter is designed to have a sufficiently lower impedance path than the source 10, and thus most of the harmonic current will flow in the filter. By providing a filter near each load 12, the portion of the neutral conductor 20 located between the transformers 30, 40 and 50 and the source 10 will have much less third harmonic current than otherwise. The filter has advantages over conventional L-C filters in that it does not interact with positive or negative sequence current at the fundamental frequency or resonant frequencies. In addition, there is no reactive injection of power into the system which occurs with convention filters.

In situations where several loads 12 are coupled to one source 10, it may be necessary for balancing purposes to isolate the loads 12 by adding a reactor 70 (e.g. an inductor) in series with the neutral conductor 20, as shown in FIG. 1. Reactor 70 may also be needed if the impedance of source 10 is very low to prevent harmonic current from bypassing the filter. If the source 10 has a high impedance relative to the impedance of each transformer 30, 40 and 50, the capacitor 60 may be removed resulting in a delta connection of secondary windings 34, 44 and 54.

The neutral conductor filter of the present invention shunts harmonic current from the neutral conductor. Thus, it is not necessary to overate the neutral conductor, or the source because the harmonic current is dissipated by the filter.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A filter for reducing harmonic current in a neutral conductor comprising:

a first transformer primary winding connected to the neutral conductor and a first power conductor;

a second transformer primary winding connected to the neutral conductor and a second power conductor;

a third transformer primary winding connected to the neutral conductor and a third power conductor;

a first transformer secondary winding connected in series with a second transformer secondary winding connected in series with a third transformer secondary winding; and a capacitor connected in parallel with the series connected first transformer secondary winding, second transformer secondary winding and third transformer secondary winding.

2. The filter of claim 1 further comprising:

an inductor in series with said neutral conductor.

3. A filter for reducing harmonic current in a neutral conductor comprising:

a first transformer primary winding connected to the neutral conductor and a first power conductor;

a second transformer primary winding connected to the neutral conductor and a second power conductor; and a third transformer primary winding connected to the neutral conductor and a third power conductor;

wherein a first transformer secondary winding, a second transformer secondary winding, and a third transformer secondary winding are delta connected.

* * * * *